United States Patent
Chen et al.

(10) Patent No.: US 12,218,541 B2
(45) Date of Patent: Feb. 4, 2025

(54) BATTERY SAFETY MANAGEMENT SYSTEM AND PROCEDURE THEREOF

(71) Applicant: Getac Technology Corporation, New Taipei (TW)

(72) Inventors: Li-Shing Chen, Taipei (TW); Yng-Wei Lee, Taipei (TW)

(73) Assignee: Getac Technology Corporation, New Taipei (TW)

( * ) Notice: Subject to any disclaimer, the term of this patent is extended or adjusted under 35 U.S.C. 154(b) by 517 days.

(21) Appl. No.: 17/591,326

(22) Filed: Feb. 2, 2022

(65) Prior Publication Data

US 2023/0246468 A1  Aug. 3, 2023

(51) Int. Cl.
*H02J 7/00* (2006.01)

(52) U.S. Cl.
CPC ...... *H02J 7/00712* (2020.01); *H02J 7/00302* (2020.01); *H02J 7/00306* (2020.01); *H02J 7/0048* (2020.01)

(58) Field of Classification Search
USPC ......................................................... 320/136
See application file for complete search history.

(56) References Cited

U.S. PATENT DOCUMENTS

| 5,764,033 A * | 6/1998 | Tamai | H02J 7/0031 320/132 |
| 6,583,604 B2 * | 6/2003 | Kim | H02J 7/0069 320/132 |

* cited by examiner

*Primary Examiner* — Samuel Berhanu
(74) *Attorney, Agent, or Firm* — Locke Lord LLP; Tim Tingkang Xia, Esq.

(57) ABSTRACT

A battery safety management procedure applicable to a battery safety management system is provided. The battery safety management system includes a controller, storage, and battery. The battery safety management procedure is stored in the storage and executed by the controller to perform steps of: determining whether a power level of the battery is greater than or equal to a power level threshold and determining whether a power storage time is greater than or equal to a time threshold; and performing a discharging procedure when the power level of the battery is greater than or equal to the power level threshold, and the power storage time is greater than or equal to the time threshold. Time control and power level control prevents the battery from being in a prolonged state of high power level to reduce the chance of battery swelling, leaks, abnormalities, and damage, thereby extending battery service life.

8 Claims, 2 Drawing Sheets

BATTERY SAFETY MANAGEMENT SYSTEM AND PROCEDURE THEREOF

BACKGROUND OF THE INVENTION

Field of the Invention

The present disclosure relates to a battery safety management system and a procedure thereof.

Description of the Prior Art

Lithium batteries are widely used in power-supplying devices of various portable electronic products, wireless transmission electronic products, consumer electronic products, military electronic products, and the like.

Lithium batteries not only have advantages, namely having no memory effect, low spontaneous discharging, quick charging and discharging, and wide operating temperature range, but also have a disadvantage, that is, over-charging and over-discharging causes the irreversible shortening of battery service life and even damage.

It is generally believed that lithium batteries stored in high-temperature environment are likely to cause battery swelling and damage, which happens in overly high temperature environment and overly low temperature environment. In addition, lithium batteries operating at room temperature in a prolonged state of high power level end up with accumulation of pressure inside the batteries and thus battery swelling, leaks, service life shortening, and damage, thereby deteriorating the safety and reliability of devices using the batteries.

SUMMARY OF THE INVENTION

Batteries operating at room temperature in a prolonged state of high power level end up with accumulation of pressure inside the batteries. Therefore, the present disclosure provides a battery safety management system and a procedure thereof. The battery safety management system and procedure are advantageous in that time control and power level control prevents the batteries from being in a prolonged state of high power level to reduce the chance of battery swelling, leaks, abnormalities, and damage, thereby extending battery service life.

The present disclosure provides a battery safety management system comprising: a battery; a storage for storing a battery safety management procedure; and a controller coupled to the battery and the storage and adapted to execute the battery safety management procedure of the battery, wherein the battery safety management procedure comprises the steps of: determining whether a power level of the battery is greater than or equal to a power level threshold, and whether a power storage time is greater than or equal to a time threshold; and performing a discharging procedure of the battery upon determination that the power level of the battery is greater than or equal to the power level threshold, and that the power storage time is greater than or equal to the time threshold.

The present disclosure provides a battery safety management procedure applicable to a battery safety management system. The battery safety management system comprises a controller, a storage and a battery. The battery safety management procedure is stored in the storage and executed by the controller to perform the steps of: determining whether a power level of the battery is greater than or equal to a power level threshold and whether a power storage time is greater than or equal to a time threshold; and performing a discharging procedure of the battery upon determination that the power level of the battery is greater than or equal to the power level threshold, and that the power storage time is greater than or equal to the time threshold.

In an embodiment of the present disclosure, the battery safety management procedure further comprises the steps of: determining whether the power level of the battery is less than the power level threshold while performing the discharging procedure of the battery; and stopping the discharging procedure of the battery upon determination that the power level of the battery is less than the power level threshold.

In an embodiment of the present disclosure, after the step of determining whether the power level of the battery is less than the power level threshold while performing the discharging procedure of the battery, the battery safety management procedure further comprises the step of performing the discharging procedure of the battery upon determination that the power level of the battery is greater than or equal to the power level threshold.

In an embodiment of the present disclosure, the battery safety management procedure further comprises, upon determination that the power level of the battery is less than the power level threshold, or that the power storage time is less than the time threshold, the step of determining whether the power level of the battery is greater than or equal to the power level threshold, and whether the power storage time is greater than or equal to the time threshold.

In an embodiment of the present disclosure, the power level threshold is a safe stored power level of the battery.

The present disclosure provides a battery safety management system using a battery safety management procedure, which are advantageous in that power level control and power storage time control prevents batteries from being in a prolonged state of high power level at room temperature to reduce the chance of battery swelling, leaks, abnormalities, and damage, thereby extending battery service life.

The present disclosure is hereunder illustrated by embodiments, depicted by accompanying drawings and described below to render the above and other objectives, features and advantages of the present disclosure clear and easy to understand.

DETAILED DESCRIPTION OF THE EMBODIMENTS

Figure 1:
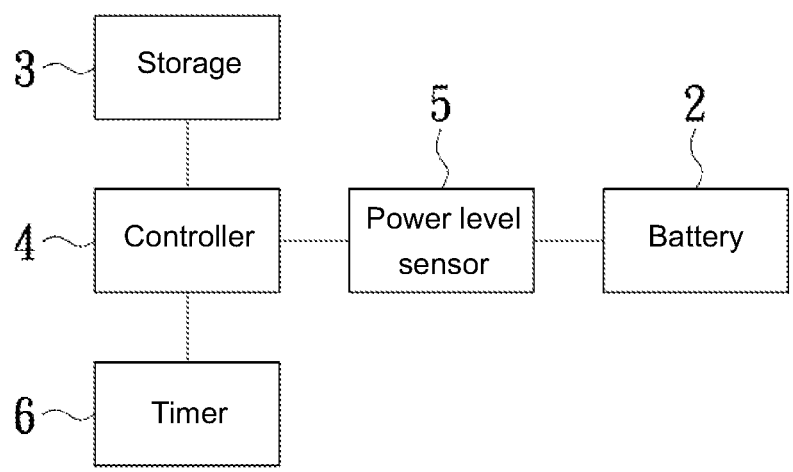
FIG. 1 is a block diagram of a battery safety management system in an embodiment of the present disclosure.

Referring to FIG. 1, there is shown a block diagram of a battery safety management system 1 in an embodiment of the present disclosure. In an embodiment of the present disclosure, the battery safety management system 1 comprises a battery 2, storage 3, controller 4, power level sensor 5 and timer 6.

The controller 4 uses power level sensor 5 to obtain current power level value of battery 2 and uses timer 6 to obtain power storage time while battery 2 is idle. The controller 4 executes a battery safety management procedure stored in storage 3 to control power level of battery 2 and thus prevent battery 2 from being in a prolonged state of having a high power level at room temperature. In another embodiment of the present disclosure, the storage 3, power level sensor 5 and timer 6 are disposed in controller 4.

The battery 2 is a battery capable of charging and discharging repeatedly, including but not limited to, nickel—cadmium battery, nickel—hydrogen battery, lithium polymer battery, lithium battery, and lithium ferro phosphate battery, and thus the present disclosure is not limited thereto.

The storage 3 is a storage device for storing a battery safety management procedure. The storage 3 is a storage device, including but not limited to, memory, hard disk drive, optical disk, magnetic disk, USB flash drive, and register, capable of storing the procedure to be read and executed by the controller 4, or is any device capable of doing so.

The controller 4 is coupled to battery 2 and storage 3 and adapted to execute a control device for the battery safety management procedure. The controller 4 is a control device capable of computing and executing the battery safety management procedure, including but not limited to a microprocessor and a processing unit, or is any device capable of doing so.

The power level sensor 5 measures the power level of battery 2. The power level sensor 5 is a power level sensing device capable of sensing or estimating the remaining power level of battery 2, including but not limited to voltmeter and galvanometer, or is any device capable of doing so.

The timer 6 is a timing device capable of measuring power storage time while battery 2 is idle, or is any device capable of doing so.

Figure 2:
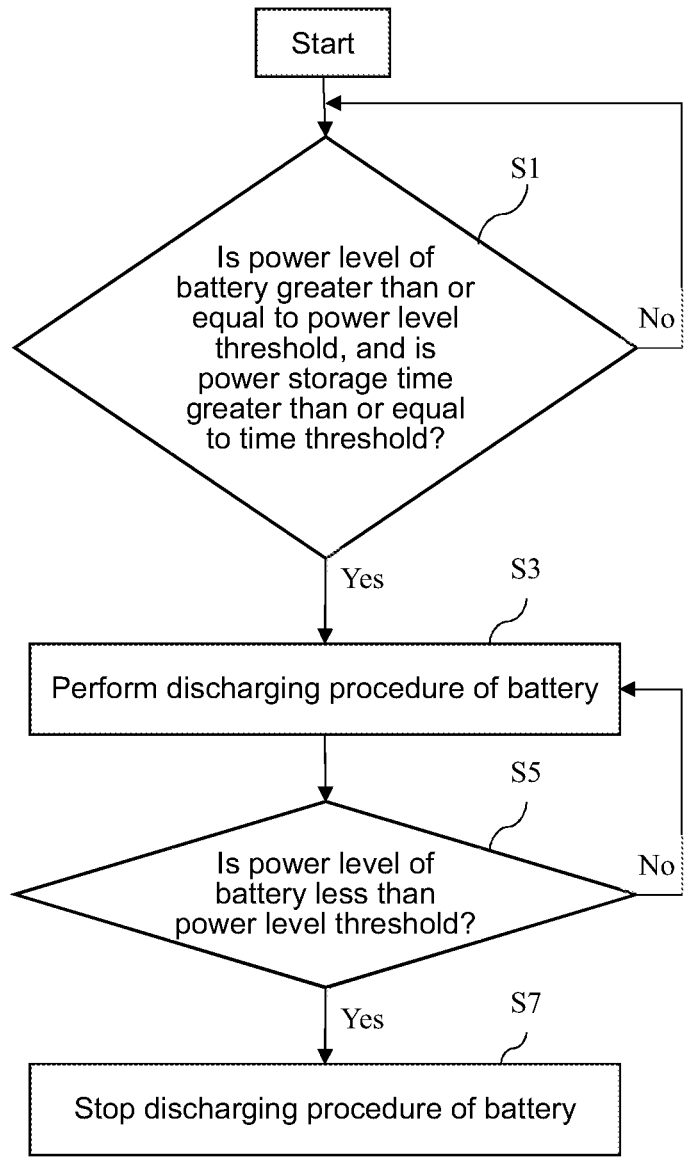
FIG. 2 is a flowchart of a battery safety management procedure in an embodiment of the present disclosure.

Referring to FIG. 2, there is shown a flowchart of a battery safety management procedure in an embodiment of the present disclosure.

The controller 4 executes the battery safety management procedure shown in FIG. 2 to control the power level of battery 2. The steps of the battery safety management procedure are described below. In step S1, controller 4 determines whether the power level of battery 2 is greater than or equal to a power level threshold, and whether power storage time is greater than or equal to a time threshold. When the answer to at least one of the aforesaid two questions (about power level and about power storage time) is negative, step S1 repeats itself. It should be noted that the power level and the power storage time are detected constantly during the process. It is only when both the answers to the aforesaid two questions (about power level and about power storage time) are affirmative that the procedure leaves step S1 for step S3.

The power level threshold and the time threshold of battery 2 in step S1 are defined according to the size, dimensions and type of battery 2, that is, the features of battery 2. In another embodiment of the present disclosure, the power level threshold of battery 2 is defined to be equal to 90% of maximum battery power level of battery 2. In yet another embodiment of the present disclosure, the time threshold is defined as 3 days, 5 days, or 7 days. The power level threshold and the time threshold are not limited thereto but are determined according to the features of battery 2.

In step S3, controller 4 begins a discharging procedure of battery 2. In an embodiment of the present disclosure, the discharging procedure is jointly executed with a switch and a power-consuming component. The switch is capable of controlling a discharging circuit to turn on or breaking the continuity of an electrical circuit, for example, a transistor switch, photoelectric switch, and relay. The power-consuming component, for example, a resistor, inductor, capacitor, cellphone, and tablet, consumes power stored in battery 2.

In step S5, controller 4 determines whether the power level of battery 2 is less than the power level threshold. When the determination is negative, the process flow of the battery safety management procedure returns to step S3 to repeat the discharging procedure of battery 2. It is only when the determination in step S5 is affirmative that the process flow of the battery safety management procedure leaves step S3 and S5 and goes to step S7 to stop the discharging procedure of battery 2. In another embodiment of the present disclosure, battery 2 will be recharged only if the power level of the idling battery 2 reaches 80% of maximum battery power level.

In a variant embodiment (not shown) of the battery safety management procedure, step S7 is followed by step S1, and thus the battery safety management procedure never terminates.

In conclusion, the present disclosure provides a battery safety management system and a procedure thereof, which are advantageous in that power level control and power storage time control prevents batteries from being in a prolonged state of high power level at room temperature to reduce the chance of battery swelling, leaks, abnormalities, and damage, thereby extending battery service life.

Although the present disclosure is disclosed above by embodiments, the embodiments are not restrictive of the present disclosure. Changes and modifications made by persons skilled in the art to the embodiments without departing from the spirit and scope of the present disclosure must be deemed falling within the scope of the present disclosure. Accordingly, the legal protection for the present disclosure should be defined by the appended claims.

What is claimed is:

1. A method of performing a battery safety management procedure applicable to a battery safety management system, the battery safety management system comprising a battery, the method comprising the steps of:
   (1) determining whether a power level of the battery is greater than or equal to a power level threshold and whether a power storage time is greater than or equal to a time threshold;
   (2) performing a discharging procedure of the battery, upon determination in the step (1) that the power level of the battery is greater than or equal to the power level threshold, and that the power storage time is greater than or equal to the time threshold; and
   (3) repeating the step (1), upon determination in the step (1) that the power level of the battery is less than the power level threshold, or that the power storage time is less than the time threshold.

2. The method of claim 1, further comprising the steps of:
   (4) determining whether the power level of the battery is less than the power level threshold while performing the discharging procedure of the battery in the step (2); and
   (5) stopping the discharging procedure of the battery upon determination in the step (4) that the power level of the battery is less than the power level threshold.

3. The method of claim 2, further comprising, after the step (4), repeating the step (2) upon determination in the step (4) that the power level of the battery is greater than or equal to the power level threshold.

4. The method of claim 1, wherein the power level threshold is a safe stored power level of the battery.

5. A battery safety management system, comprising:
   a battery;
   a storage for storing a battery safety management procedure; and a controller coupled to the battery and the storage and adapted to execute the battery safety management procedure of the battery, wherein the battery safety management procedure comprises the steps of:
- (1) determining whether a power level of the battery is greater than or equal to a power level threshold, and whether a power storage time is greater than or equal to a time threshold;
- (2) performing a discharging procedure of the battery upon determination that the power level of the battery is greater than or equal to the power level threshold, and that the power storage time is greater than or equal to the time threshold; and
- (3) repeating the step (1), upon determination in the step (1) that the power level of the battery is less than the power level threshold, or that the power storage time is less than the time threshold.

6. The battery safety management system of claim 5, wherein the battery safety management procedure further comprises:
- (4) determining whether the power level of the battery is less than the power level threshold while performing the discharging procedure of the battery in the step (2); and
- (5) stopping the discharging procedure of the battery upon determination in the step (4) that the power level of the battery is less than the power level threshold.

7. The battery safety management system of claim 6, wherein, after the step (4), the battery safety management procedure further comprises repeating the step (2) upon determination in the step (4) that the power level of the battery is greater than or equal to the power level threshold.

8. The battery safety management system of claim 5, wherein the power level threshold is a safe storage power level of the battery.

* * * * *